(12) United States Patent
Guda

(10) Patent No.: US 9,021,178 B2
(45) Date of Patent: Apr. 28, 2015

(54) HIGH PERFORMANCE PATH FOR COMMAND PROCESSING

(75) Inventor: Chandra M. Guda, Lake Forest, CA (US)

(73) Assignee: Western Digital Technologies, Inc., Irvine, CA (US)

(*) Notice: Subject to any disclaimer, the term of this patent is extended or adjusted under 35 U.S.C. 154(b) by 376 days.

(21) Appl. No.: 13/099,316

(22) Filed: May 2, 2011

(65) Prior Publication Data
US 2012/0284460 A1 Nov. 8, 2012

(51) Int. Cl.
*G06F 15/17* (2006.01)
*G06F 13/18* (2006.01)
*G06F 3/06* (2006.01)
*G06F 13/38* (2006.01)

(52) U.S. Cl.
CPC .......... *G06F 3/061* (2013.01); *G06F 13/38* (2013.01); *G06F 3/0635* (2013.01); *G06F 3/0659* (2013.01); *G06F 3/0688* (2013.01)

(58) Field of Classification Search
CPC ..... G06F 3/0635; G06F 11/201; G06F 3/061; G06F 3/0659
USPC ............................................ 711/103
See application file for complete search history.

(56) References Cited

U.S. PATENT DOCUMENTS

| 2004/0158640 | A1* | 8/2004 | Philbrick et al. ............ 709/230 |
| 2005/0204078 | A1* | 9/2005 | Steinmetz et al. ............ 710/38 |
| 2006/0277310 | A1* | 12/2006 | Kalos et al. .................. 709/228 |
| 2008/0059602 | A1* | 3/2008 | Matsuda et al. ............. 709/212 |
| 2009/0172260 | A1 | 7/2009 | Olbrich et al. |
| 2010/0306581 | A1 | 12/2010 | Johnson |
| 2011/0004707 | A1* | 1/2011 | Spry et al. ..................... 710/38 |
| 2012/0221767 | A1* | 8/2012 | Post et al. ..................... 711/103 |

* cited by examiner

*Primary Examiner* — Matthew Bradley
*Assistant Examiner* — Candice Rankin

(57) ABSTRACT

Embodiments of solid-state storage system are provided herein which reduce processing delays for performance-sensitive commands. These performance-sensitive commands are typically read-write commands which can be transferred to the storage media by a high performance path to optimize responsiveness to the host. This high performance path can be enabled and disabled to prevent conflicts with commands processed via a low performance path.

18 Claims, 6 Drawing Sheets

Figure 6

| Command Order | Command Type | Command Size (128Kb buffers) | Processing (Threshold 1) |
|---|---|---|---|
| 1 | High Performance Write | 4Kb | HPP |
| 2 | High Performance Read | 4Kb | HPP |
| 3 | High Performance Write | 4Kb | HPP |
| 4 | High Performance Write | 1Mb | LPP (Disable HPP) |
| 5 | High Performance Write | 4Kb | LPP (Enable HPP) |
| 6 | High Performance Write | 4Kb | HPP |
| 7 | System Lock | | LPP (Disable HPP) |
| 8 | High Performance Write | 4Kb | LPP (Unsuccessful) |
| 9 | System Unlock | | LPP (Enable HPP) |
| 10 | High Performance Read | 4Kb | HPP |

HIGH PERFORMANCE PATH FOR COMMAND PROCESSING

BACKGROUND

1. Technical Field

This disclosure relates to non-volatile storage subsystems, including but not limited to flash drives. More particularly, the disclosure relates to systems and methods for implementing a high performance path for command processing.

2. Description of the Related Art

Solid-state storage systems provide very fast memory access times for read/write commands. As such, processing delays for incoming commands can now become a cause of perceptible delays from the host. Typical command processing interprets all possible commands at a single point, which can cause processing delays. A system that can detect read and write commands and quickly pass these commands to the storage media can improve processing performance and reduce delay.

BRIEF DESCRIPTION OF THE DRAWINGS

Systems and methods that embody the various features of the invention will now be described with reference to the following drawings, in which:

FIG. 6 shows the processing of several commands according to an embodiment.

DETAILED DESCRIPTION

Figure 1:
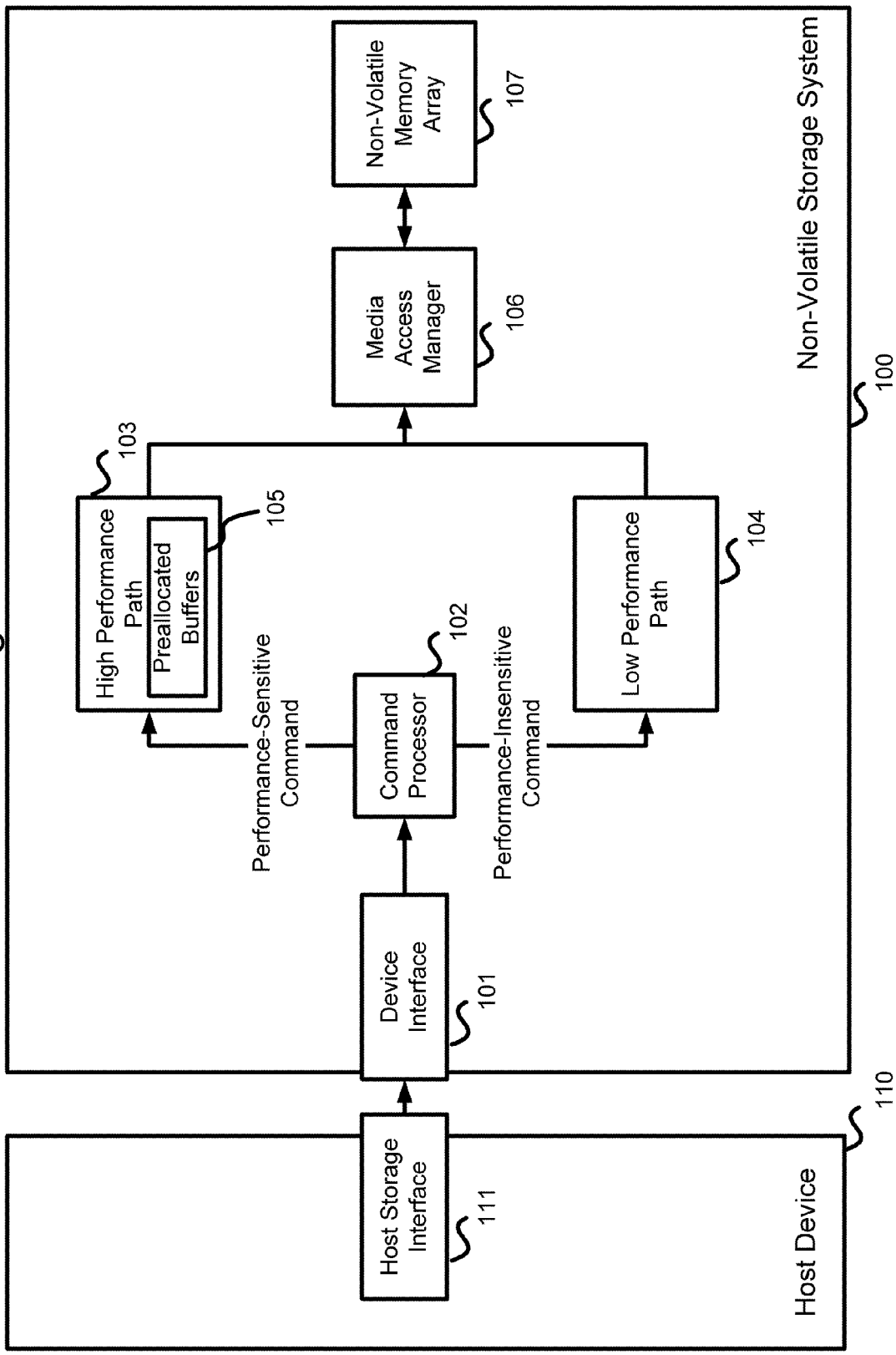
FIG. 1 illustrates a system overview of a non-volatile storage system connected to a host device according to an embodiment.

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

Overview

Command validation is a key task to be performed before the commands are serviced by a drive. But at the same time it consumes a major portion of command execution time which can degrade the performance of the drive. Embodiments of the invention help avoid certain type of command validations, which reduces the penalty incurred on commands sent to the drive and, in certain cases, limits the penalty to only a subsequent command that follows a command needing validation.

Currently, in certain types of Hard Disk Drive (HDD) firmware, command validations are performed on all the commands without distinguishing whether a command is performance-sensitive or non-performance-sensitive. HDD IOPS, which are lower, can allow the firmware overhead to check these commands as the latencies of sending the command to the disk are much higher and these checks can be performed in parallel. Since a Solid State Drive (SSD) has a very high IOPS requirement, the firmware overhead becomes increasingly noticeable. Similar checks could be present in streaming algorithms used by disk technology. However, since the performance requirement is not typically critical, some implementations tend to go through the command validation before the next request can be sent down to the media components of HDD.

System Overview

Embodiments of the invention are directed to systems and methods for reducing delays when performing performance-sensitive read/write commands on a non-volatile storage system. In embodiments, command processing occurs along a high-performance path to expedite processing of eligible high-performance commands. In additional embodiments, the high-performance path may be disabled to process low-performance path commands and prevent conflicting behavior during low-performance path processing.

As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Referring now to FIG. 1, FIG. 1 shows an embodiment of a non-volatile storage system 100 connected to a host device 110. The host device 110 communicates with a device interface 101 of the non-volatile storage system 100 using a host storage interface 111. The host storage interface 111 can communicate with the device interface using any known communication protocol, such as SATA, SCSI, SAS, SCSI, USB, Fibre Channel, etc. Preferably, the communication protocol allows for the use of tagged commands, such that multiple read or write commands may be pending on the storage system simultaneously. Tagged commands can include tagged command queuing and native command queuing tags.

Commands received by the device interface 101 are then passed to the command processor 102. Command processor 102 evaluates the received command and determines whether to submit the command to high performance path 103 or low performance path 104. High performance path 103 is used to quickly transfer commands to a non-volatile media array 107. High performance path 103 is used for performance-sensitive commands, such as drive read or write commands. Low performance path 104 is capable of processing any drive command, but accordingly may not proceed to process these commands as quickly as high performance path 103. For example, certain commands that do not have performance requirement may be sent to the low performance path. In various embodiments, the low performance path contains the command validation checks needed to be performed on a command before being serviced by the drive, as well as the error handling firmware necessary to service the commands if needed. For example, command validations are performed for commands that affect the behavior of the subsequent commands sent to the drive, e.g., ATA security commands, ATA power management commands, etc.

In order to service read and write commands quickly, high performance path 103 includes pre-allocated buffers 105 which can be used to ensure there is adequate buffer space without the delay associated with allocating a buffer from memory. Generally, the high performance path 103 should include the number of pre-allocated buffers according to the number of possible tagged commands which can be received by the storage system. For example, a system using a SATA interface with a maximum of 32 tagged commands, the high performance path 103 includes 32 preallocated buffers 105 to enable servicing of the entire range of tagged commands without delay. In some embodiments, the pre-allocated buffers are reused by subsequent commands. For example, a particular buffer may consistently be used with a command using a particular tag (e.g. buffer 15 may always service commands tagged 15).

Once the commands are received in the high performance path 103, the high performance path 103 then transfers commands to the media access manager 106. Low performance path 104 is capable of accepting all drive commands, including commands which access the memory array. As such, low performance path 104 can also transfer these media access commands to the media access manager 106. Media access manager 106 executes the media access commands on non-volatile memory array 107. In a solid-state memory array system, memory access on non-volatile memory array 107 can be very fast. As such, processing delays on other components of the system can result in noticeable delays from the host perspective as memory access may no longer be the limiting factor. Designating a high performance path for eligible memory access commands expedites memory access commands and reduces any delays attributable to the controller. The command processor 102, high performance path 103, low performance path 104, and media access manager 106 may be implemented in a program for a single processor, may be spread across a plurality of processors, or may be implemented in hardware.

Figure 2:
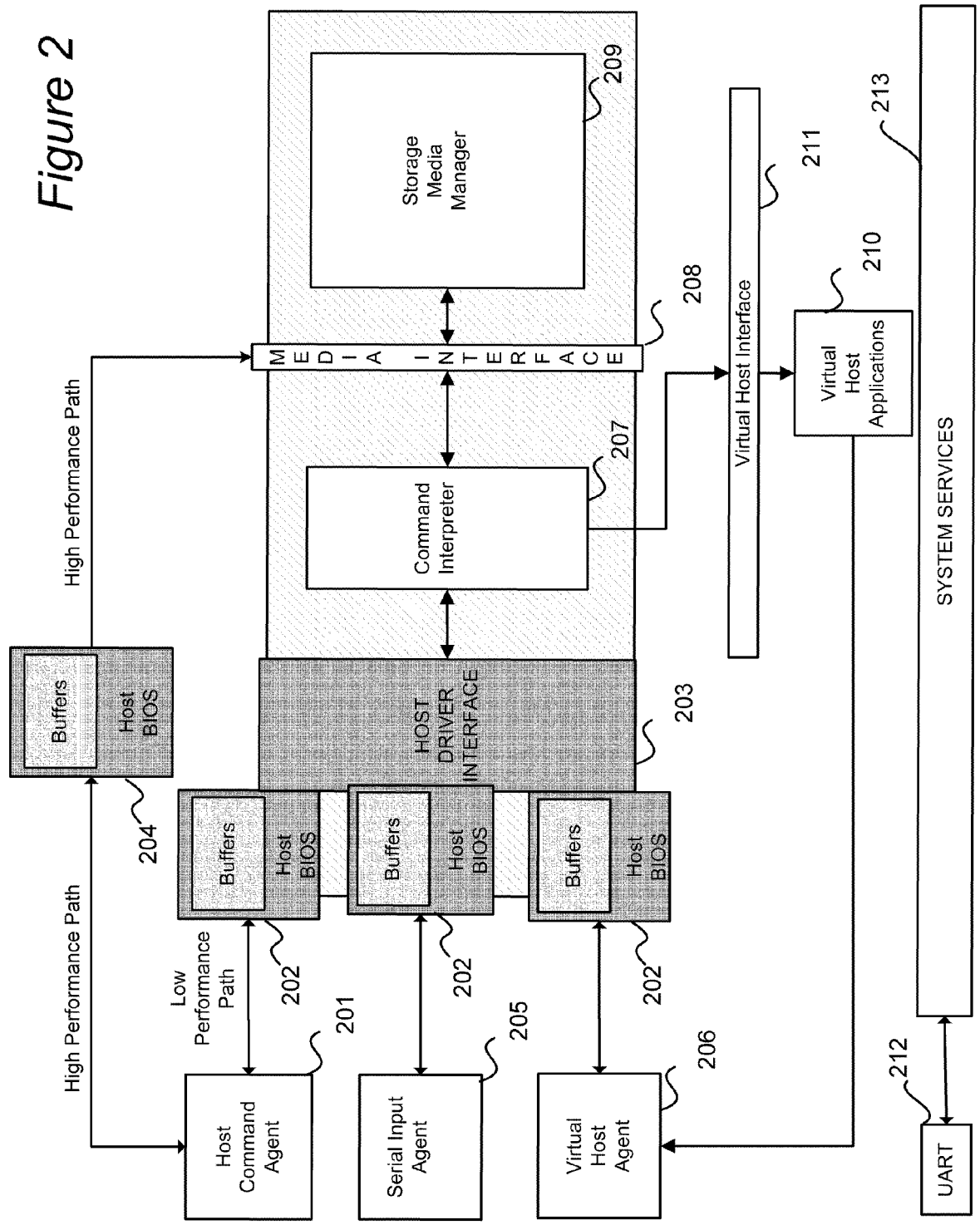
FIG. 2 illustrates a more detailed system overview of a non-volatile storage system according to an embodiment.

Referring now to FIG. 2, a more detailed system overview of command processing paths is shown according to an embodiment. A host command agent 201 receives commands from the host system from the standard device interface, such as a SATA or SAS connection. The host command agent 201 can determine whether the command received from the host is processed by the high or low performance path. The determination will be further described below in conjunction with FIGS. 3-6. The host command agent 201 processes low performance path commands by passing it to a host BIOS 202, which includes buffers for storing data about the command. The host BIOS 202 provides the data to the host driver interface 203 which collects and schedules commands for communication with a command interpreter 207. If the host command agent 201 has a high performance path command, the command agent 201 can pass the command to host BIOS 204 for processing along the high performance path. As shown, the host BIOS 204 on the high performance path passes the command directly to the media interface 208 for communication with the storage media manager 209.

As shown in the embodiment of FIG. 2, a plurality of host BIOS 202 components can receive commands and pass the command to the host driver interface 203. Shown in this embodiment is a serial input agent 205, which can receive commands through a serial port interface on the storage system. In addition, a virtual host agent 206 receives and processes commands received from virtual host applications 210. For example, virtual host applications 210 can include a host self testing application/operation. The virtual host applications 210 can receive information about commands processed by the system via the virtual host interface 211. The storage system may also include a UART serial port 212, which provides a low-level interface to a group of system services 213. The system services 213 provide basic services for the storage system, including an operating system, a system clock, memory management, and other system support. Though not shown by individual connections in FIG. 2, the system services 213 may be in communication with all portions of the storage system firmware to provide these underlying services.

Performance Path Enablement

Figure 3:
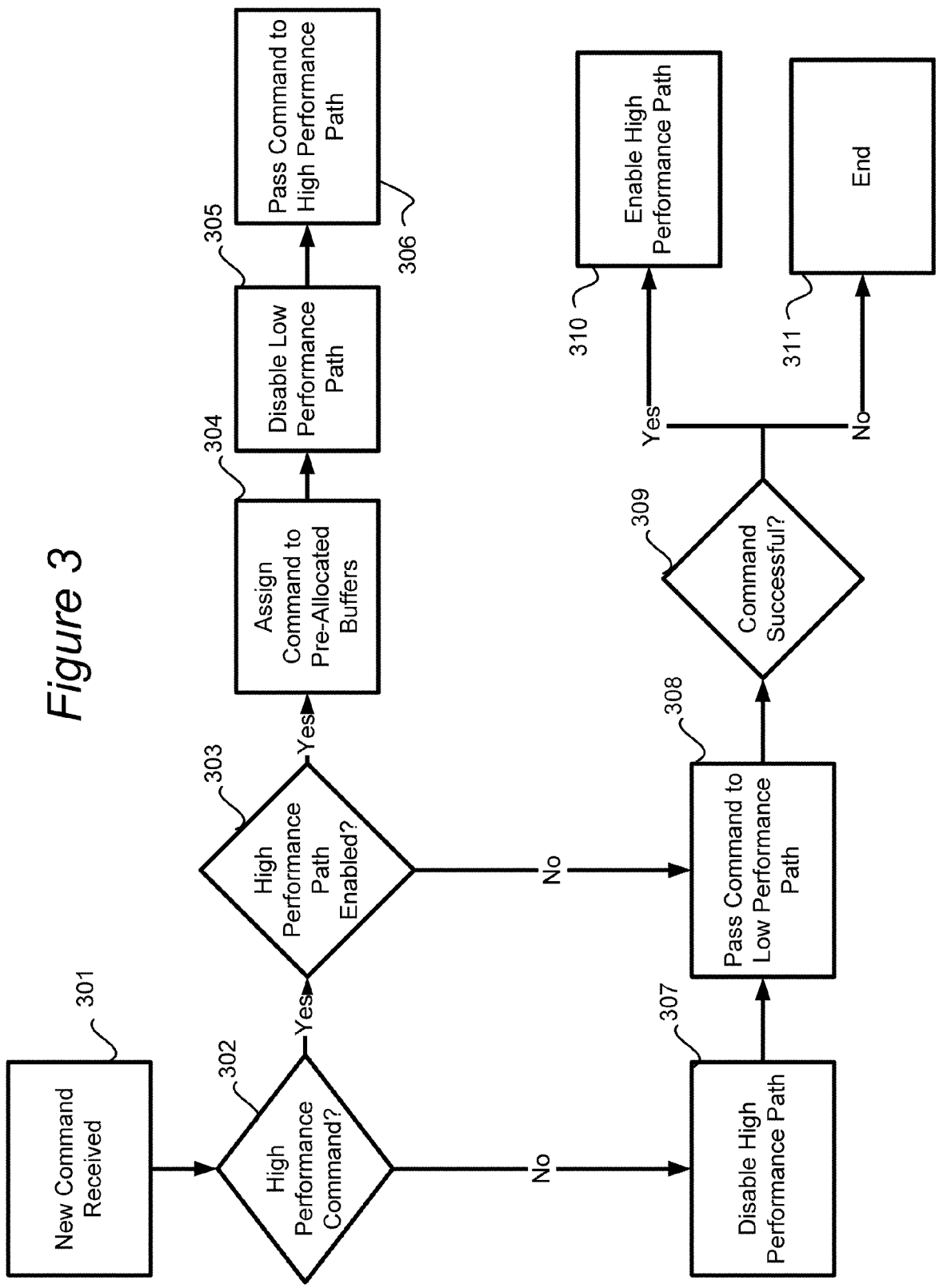
FIG. 3 illustrates a command path processing flowchart according to an embodiment.

In some embodiments, the high performance path may be disabled and enabled. When the high performance path is disabled, commands which would otherwise be processed by the high performance path may be processed by the low performance path. For example, certain low performance commands may change system characteristics or alter host access permissions. While these commands are pending or active, the storage system may prevent otherwise eligible high performance commands from being processed by the high performance path. FIG. 3 shows an example of command handling in a system configured to enable and disable the high performance path.

Referring now to FIG. 3, at block 301, a new command is received. The processing of the command according to FIG. 3 can be performed by the command processor 102 or other system component in FIG. 1 to determine whether to submit the command to the high or low performance path. At block 302, the system determines whether the received command is eligible for the high performance path. If it is, the system next in block 303 determines if the high performance path is enabled. If the command is an eligible high performance path command and the high performance path is enabled, the command is assigned a pre-allocated buffer at block 304. The system may then disable the low performance path at block 305 and pass the command to the high performance path at block 306.

If the command is not a high performance eligible command as determined at block 302, it can be passed to the low performance path. First, the ineligible command causes the high performance path to be disabled at block 307, and is then passed to the low performance path at block 308. If a command is eligible for the high performance path but the high performance path is disabled as determined at block 303, the command can also be passed to the low performance path at block 308. After the command is executed by the low performance path, the system in block 309 checks whether the command was successful. If the command is successful at the low performance path, the high performance path is enabled at block 310. If the command is unsuccessful, the high performance path remains disabled at block 311. By enabling and disabling the high and low performance paths, the system can ensure that the separate processing routes do not cause conflicts with one another. The steps of enabling and disabling the high or low performance paths may not be necessary in an implementation which prevents conflicts in another way, such as with additional programming in the low performance path.

Figure 4:
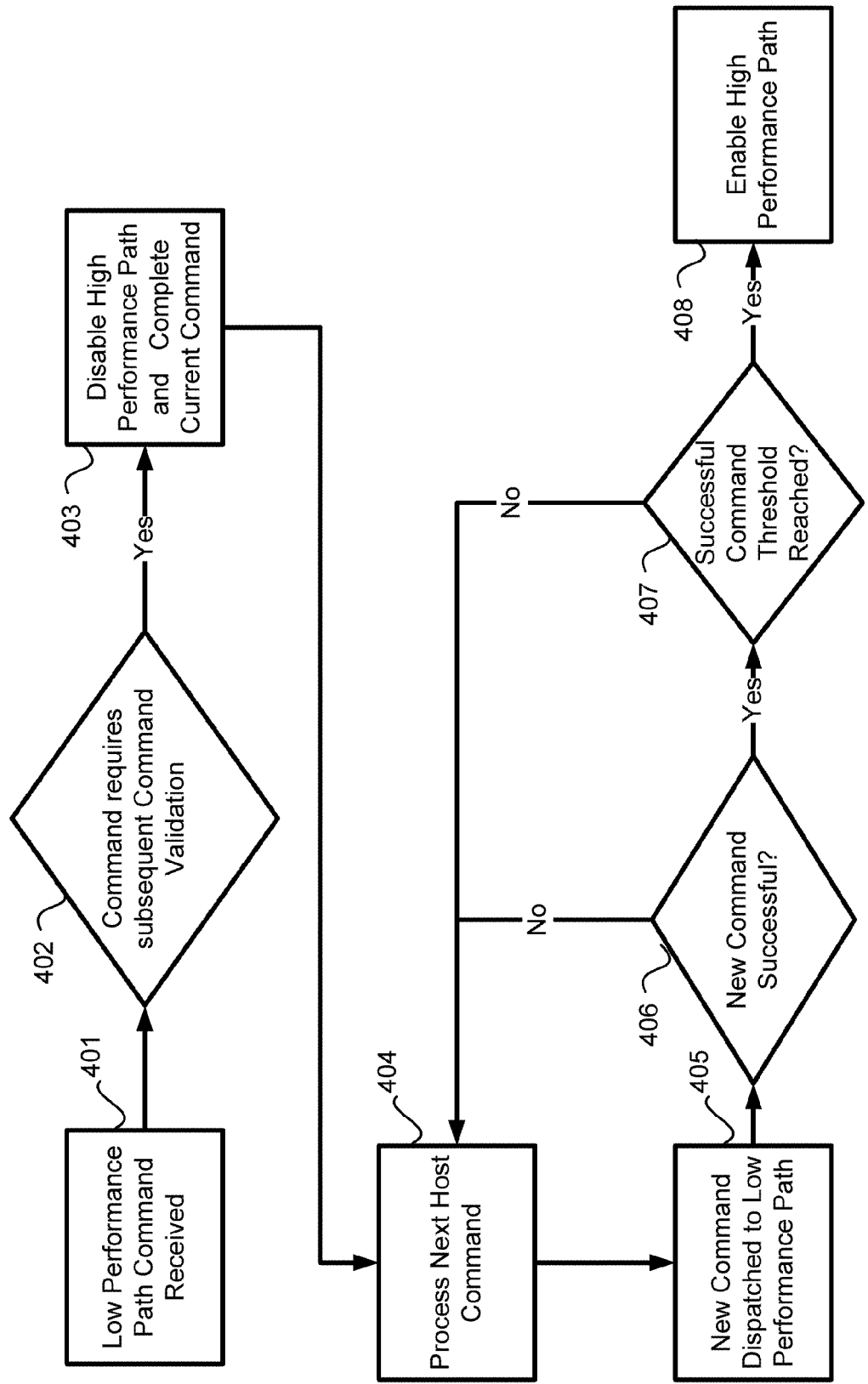
FIG. 4 illustrates a flowchart for command path enabling according to an embodiment.

Referring now to FIG. 4, FIG. 4 shows an alternate embodiment of a method for low performance path command handling. The method as shown can be performed by the command processor 102 or other system component shown in FIG. 1. At block 401, a low performance command is received. At block 402, the command is determined to require subsequent command validation. For example, a command which changes access or security setting may require additional checks on commands after the command which changes settings completes. At block 403, the high performance path is disabled and the current command is completed via the low performance path. At block 404, a new command is received and processed. At block 405, the new command is dispatched to the low performance path for processing. At block 406, if the command is successful, it will be evaluated at block 407 to determine if a threshold number of successful commands have been completed. If the command was not successful or the threshold has not yet been reached, a new command will be processed at block 404. If the threshold number of successful commands is reached at block 407, the high performance path can be enabled at block 408. In this embodiment, the high performance path is disabled until a certain number of commands successfully complete processing via the low performance path. In this way, the high performance path will be re-enabled when the low performance path is demonstrating successful command completion. In some embodiments, the threshold number of subsequent low performance path commands is one command. While there is a slight performance penalty to process a subsequent command in the low performance path, this ensures proper routing of commands, which prevents errors, and avoids the need for additional checking mechanism in the high performance path. In other embodiments, the number of subsequent low performance commands is determined by the type of commands processed by the low performance path.

High Performance Path Eligibility

Figure 5:
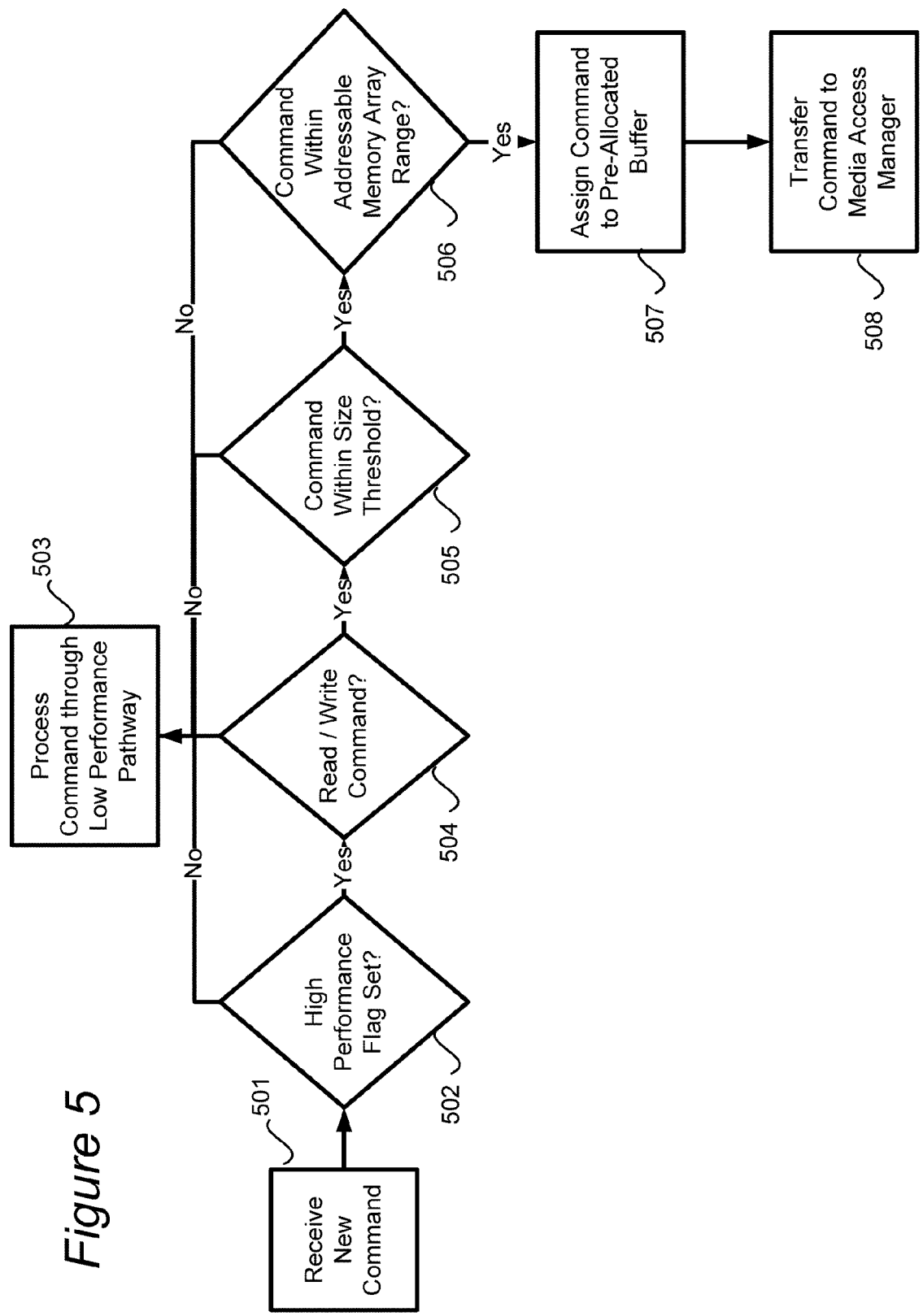
FIG. 5 illustrates a flowchart for determining eligibility for entry into a high performance path according to an embodiment.

With reference to FIG. 5, FIG. 5 illustrates a flowchart showing a method for determining eligibility of a command for the high performance path. The method in FIG. 5 can be implemented by the command processor 102 or other system component shown in FIG. 1. At block 501, a new command is received by the non-volatile storage system. At block 502, the command is checked for a high performance flag. In certain command specifications, such as SATA, commands may include a high performance flag to indicate the command is performance-sensitive. If a specification is used which does not indicate a high performance flag, or is unreliably used by host systems, block 502 may be omitted. In one embodiment, if any of the tests at blocks 502, 504, 505, or 506 fail, the command is processed through the low performance path at block 503. Other embodiments may use one or more of these tests. At block 504, the command is checked to determine if it is a read or write command. At block 505, the command is tested for whether it is a read or write command within a size threshold. Generally, because of the use of preallocated buffers, the read or write command must be within a permissible size to be used with the preallocated buffers. If a read or write command is oversize, the low performance path is used to allocate appropriate buffer space, and, if necessary, split the oversize command into several media access commands. In an embodiment, a command is oversize if it reads or writes to more than 256 sectors. Last, at block 506, the command can be range tested to ensure the command addresses a memory range appropriate for the memory array. At block 507, the command is assigned a pre-allocated buffer, and at block 508 transferred to the media access manager to perform the media access.

FIG. 6 shows the processing path for an example series of sequentially received commands according to an embodiment which disables the high performance path upon receipt of a low performance path command, and enables the high performance path when a subsequent low performance path command is successful. As indicated the command size limit for high performance path eligibility is 128 Kb and the threshold for re-enabling the high performance path is one successful command. As shown, the first three commands are high performance read and write commands with a size of 4 Kb. In this example, 4 Kb is under the size threshold for the preallocated buffers, and so these commands are processed by the high performance path (HPP). Command 4 is a high performance write, but it is over the size threshold at 1 Mb. As such, command 4 is processed by the low performance path (LPP) and the HPP is disabled until a subsequent command successfully completes the LPP. The fifth command is a high performance write command with a size of 4 Kb. Normally this command would be eligible for the HPP, but because the HPP has been disabled, this command is processed by the LPP. On successful completion of the fifth command, the HPP can be enabled for future HPP-eligible commands. The sixth command is a high performance write of 4 Kb, which can be processed on the enabled HPP. The seventh command is a system lock command, which is processed by the LPP and disables the HPP. The eighth command, a high performance write of 4 Kb which would otherwise be eligible for the HPP, is processed by the LPP because the HPP is disabled. Because the eighth command is unsuccessful (no writes are performed while the system is locked) the HPP remains disabled after the eighth command. The system unlock command, the ninth command is processed via the LPP and is successful, which enables the HPP. Last, command 10 is an HPP-eligible command and is processed by the HPP.

The high performance path is particularly useful in the solid-state drive. Solid-state storage arrays typically include a plurality of dies and a plurality of channels which can be used to access the dies. As a result, the channels can be accessed simultaneously and in parallel, which allows servicing of several read/write commands at the same time. The pre-allocated buffers and high performance path can shuttle commands quickly to a media access controller that merely ensures there are no conflicts accessing the channels of dies. As such, the number of preallocated buffers in the high performance path can depend on the interface queue depth (number of possible outstanding commands) and the number of channels provided at the media array. The concurrency of hardware channels in a solid-state device paired with the pre-allocated buffers and avoidance of unnecessary command validation when possible enables the commands to be serviced by the media array very quickly.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 3, 4, and 5 may differ from those shown in the figures. Depending on the embodiment, certain of the steps described in the example above may be removed, others may be added, and the sequence of steps may be altered and/or performed in parallel.

Although this disclosure describes examples in which data are stored in groups of blocks termed superblocks, those skilled in the art will recognize that the various embodiments disclosed are applicable to systems with other memory measurement units such as planes, blocks, pages, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile memory storage system, comprising:
a non-volatile storage array;
an interface to a host system, the interface configured to receive a command from the host system; and
a processor configured to process the command, the processor including:
a high performance path, including a pre-allocated memory buffer, capable of submitting a plurality of parallel command accesses to the storage array, the high performance path configured to reduce command processing delay, and
a low performance path capable of submitting a plurality of sequenced command accesses to the storage array, the low performance path including a set of buffers for storing data corresponding to the plurality of sequenced commands,
wherein the processor is configured to perform a first determination, the first determination comprising a determination of whether the command is suitable for processing with the high performance path,
wherein the processor is further configured to perform a second determination, the second determination comprising a determination of whether a subsequent command received by the interface is to be processed with the low performance path,
wherein the second determination is based at least in part on the first determination, and
wherein the processor is further configured to, in response to determining that the command is not suitable for processing with the high performance path, disable the high performance path until a threshold number of commands are successfully processed via the low performance path.

2. The non-volatile memory storage system of claim 1, wherein only one of the high performance path and the low performance path is processing a command at a single time.

3. The non-volatile memory storage system of claim 2, wherein a read or write command designating less than or equal to 256 sectors of data and with a high performance command tag is determined to be suitable for processing with the high performance path.

4. The non-volatile memory storage system of claim 2, wherein the low performance path is further capable of processing at least one of system commands, security commands, and power management commands.

5. The non-volatile memory storage system of claim 1, wherein the determination of whether the command is suitable for processing with the high performance path is based on at least one of the command's type, the command's size, and a command priority tag.

6. The non-volatile memory storage system of claim 1, wherein the non-volatile storage array comprises solid-state memory.

7. The non-volatile memory storage system of claim 1, wherein the command is a SATA or SAS command including a command queuing tag and a performance bit.

8. The non-volatile memory storage system of claim 1, wherein the threshold number of commands is one command.

9. The non-volatile memory storage system of claim 1, wherein the interface comprises a queue for receiving a plurality of commands and the processor is further configured to concurrently determine eligibility for the high performance path for the plurality of commands in the queue.

10. The non-volatile memory storage system of claim 1, wherein the processor is further configured to perform a command validation on the command when the command is processed via the low performance path.

11. The non-volatile memory storage system of claim 10, wherein the command comprises one of a system command, a security command, and a power management command.

12. The non-volatile memory storage system of claim 1, wherein the processor is further configured to determine, in response to determining that the command is not suitable for processing with the high performance path, whether to perform a command validation on the subsequent command after the command is processed.

13. The non-volatile memory storage system of claim 12, wherein the determination of whether to perform the command validation on the subsequent command is based at least in part on a command type of the command.

14. A method of command handling performed by a solid-state storage system, comprising:
receiving, from a host, a command for a non-volatile media array;
performing a first determination, the first determination comprising a determination of eligibility of the command for a high performance path, the high performance path configured to submit a plurality of parallel commands for execution on the media array;
when the command is determined to be eligible for the high performance path:
providing the command to a pre-allocated buffer associated with the high performance path; and
processing the command via the high performance path;
when the command is determined to be not eligible for the high performance path:
processing the command via a low performance path;
storing data corresponding to data associated with the command at a set of buffers associated with the low performance path;
disabling the high performance path after processing the command via the low performance path; and
enabling the high performance path after successfully processing a threshold number of commands via the low performance path; and
performing a second determination, the second determination comprising a determination of whether a subsequent command received from the host is to be processed via the low performance path, wherein the second determination is based at least in part on the first determination.

15. The method of claim 14, wherein the eligibility of the command for a high performance path is determined in part by at least one of the command's type, priority tag, and size.

16. The method of claim 15, wherein the command eligible for the high performance path includes a read or write command under a threshold size.

17. The method of claim 16, wherein the threshold size is 256 sectors.

18. The method of claim 14, further comprising disabling the low performance path while the high performance path is processing a command.

\* \* \* \* \*